(12) United States Patent
Ran et al.

(10) Patent No.: US 8,179,440 B2
(45) Date of Patent: May 15, 2012

(54) METHOD AND SYSTEM FOR OBJECT SURVEILLANCE AND REAL TIME ACTIVITY RECOGNITION

(75) Inventors: Yang Ran, Hanover, MD (US); Ramalingam Chellappa, Potomac, MD (US); Qinfen Zheng, Ellicott City, MD (US)

(73) Assignee: University of Maryland, College Park, MD (US)

( * ) Notice: Subject to any disclaimer, the term of this patent is extended or adjusted under 35 U.S.C. 154(b) by 512 days.

(21) Appl. No.: 12/086,118

(22) PCT Filed: Dec. 5, 2006

(86) PCT No.: PCT/US2006/046164
§ 371 (c)(1),
(2), (4) Date: Oct. 20, 2009

(87) PCT Pub. No.: WO2008/057107
PCT Pub. Date: May 15, 2008

(65) Prior Publication Data
US 2010/0033574 A1    Feb. 11, 2010

Related U.S. Application Data

(60) Provisional application No. 60/743,016, filed on Dec. 5, 2005.

(51) Int. Cl.
*H04N 7/18* (2006.01)
(52) U.S. Cl. ....................................................... 348/159
(58) Field of Classification Search .................. None
See application file for complete search history.

(56) References Cited

U.S. PATENT DOCUMENTS

| | | | |
|---|---|---|---|
| 2002/0008657 A1 | 1/2002 | Poore Jr | |
| 2004/0206164 A1* | 10/2004 | Kawai et al. | ................. 73/65.07 |
| 2004/0228503 A1 | 11/2004 | Cutler | |
| 2004/0242987 A1 | 12/2004 | Liew et al. | |
| 2005/0004495 A1 | 1/2005 | Goswami | |
| 2005/0140670 A1 | 6/2005 | Wu et al. | |

\* cited by examiner

*Primary Examiner* — Nhon Diep
(74) *Attorney, Agent, or Firm* — Rosenberg, Klein & Lee

(57) ABSTRACT

Method and system for objects surveillance and real-time activity recognition is based on analysis of spatio-temporal images of individuals under surveillance where a spatio-temporal volume occupied by each individual is decomposed by crossing the same at specific heights to form 2-dimensional slices, each containing representation of trajectory of the motion of corresponding portions of the individual body. The symmetry of the trajectories (Gait DNA) is analyzed and classified to generate data indicative of a type of activity of the individual based on the symmetry or asymmetry of the Gait DNA in each 2-dimensional slice. An effective occlusion handling ability is implemented which permits to restore the occluded silhouette of an individual.

20 Claims, 14 Drawing Sheets

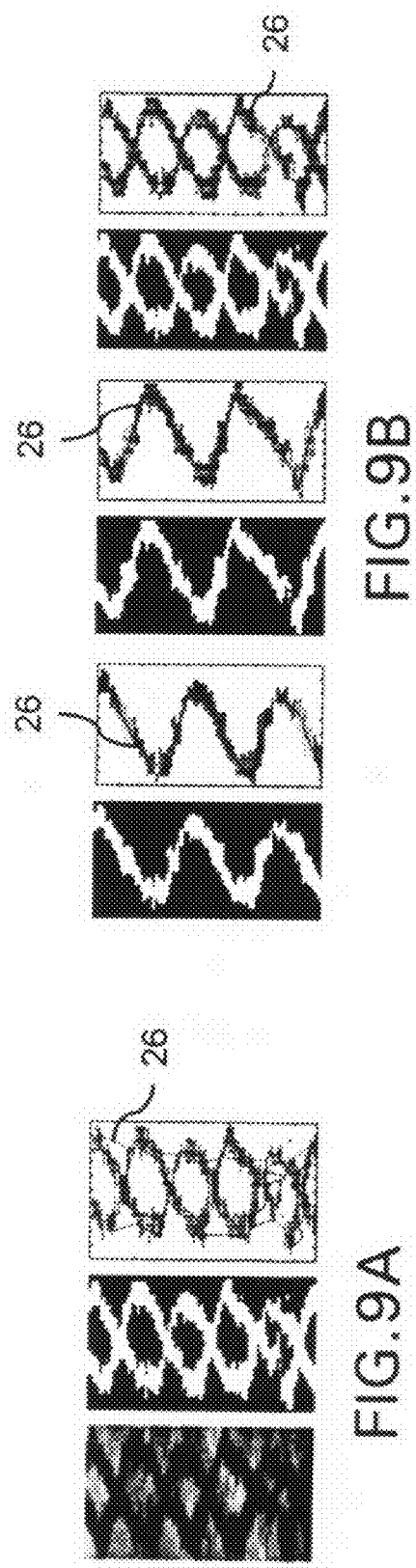

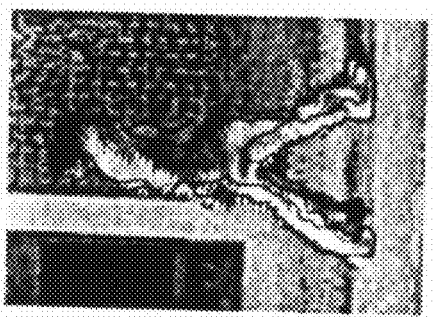
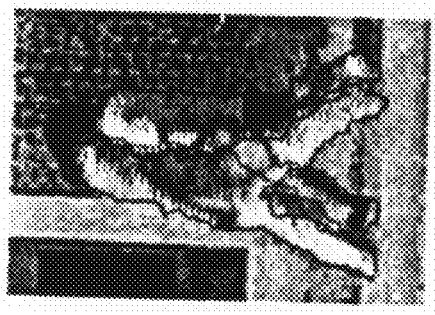
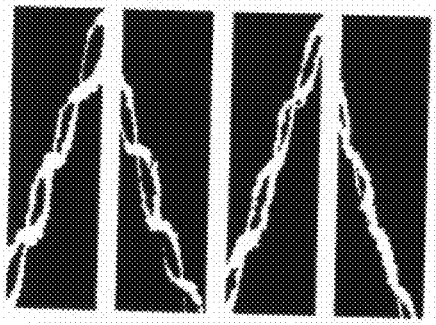
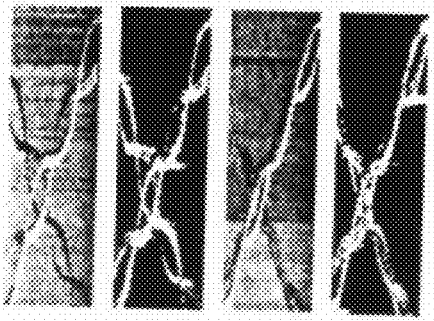
FIG. 13A
FIG. 13B
FIG. 13C
FIG. 13D

METHOD AND SYSTEM FOR OBJECT SURVEILLANCE AND REAL TIME ACTIVITY RECOGNITION

This utility Patent Application is based on the Provisional Patent Application Ser. No. 60/743,016 filed 5 Dec. 2005.

The work was funded in part by the U.S. Government Army Research Lab Contract Number DAAD 190120008.

FIELD OF THE INVENTION

The present invention relates to visual surveillance and real time individual activity recognition.

More in particular, the present invention is directed to a surveillance system capable of real time recognition of individuals activity based on symmetry and compactness of gait topology of each individual under surveillance.

In overall concept, the present invention is directed to activity monitoring and unusual behavior detection, applicable to national and personal security environments in which spatio-temporal images of a plurality of individuals are acquired and transformed into a spatio-temporal volume which is then decomposed into a plurality of 2-dimensional slices. Each slice contains trajectories of the articulations of corresponding portions of the individual's body. The symmetry of the trajectories in each 2-dimensional slice is analyzed to classify a type of activity of the individual.

The present invention is further directed to a system for individuals surveillance and real-time events recognition which includes a plurality of image sensing units (motion and stationary video cameras, scanning equipment, range sensors) for sensing spatio-temporal images of the individuals. A computer system acquires the sequences of spatio-temporal images and processes the same to create real time detection of the unusual activity of the objects under surveillance based on the symmetry (or asymmetry) of the topology of the individuals' gait.

BACKGROUND OF THE INVENTION

The growing need for ubiquitous and persuasive intelligence for national and personal security has increased the interest in visual surveillance of individuals. A number of systems have been developed to address the visual surveillance such as, for example, image based systems in which the appearance of individuals is captured in a sequence of frames in the recorded video sequence. An analysis of individual's behavior is performed based on observation of the individual appearance and detection and classification of changes from one frame to another. Although applicable for individuals surveillance, this system is however extremely inefficient for real time activity monitoring as the analysis strategy is based on coverage of a sequence of frames during a predetermined time period which may be extensive. Further the system demands expensive power and memory processing facilities which is impractical for many applications.

Therefore an efficient system for real time recognition of individuals activity is needed for visual surveillance.

SUBJECT OF THE INVENTION

It is an object of the present invention to provide a surveillance and real time activity recognition system which analyzes the individual's behavior and detects unusual activity in real-time domain and which is compact and commercially feasible.

It is a further object of the present invention to provide a surveillance system and method which analyzes, in real-time, the acquired spatio-temporal images of individuals based on a symmetry of each individual gait acquired from the spatio-temporal images.

It is another object of the present invention to provide a visual surveillance system and method in which spatio-temporal images of the individuals are transformed into a spatio-temporal volume occupied by each individual. The spatio-temporal volume of each individual is decomposed into a plurality of cross-sectional 2-dimensional slices each containing a representation of a pair of trajectories of the motion of right and left corresponding portions of the individual's body. The symmetry of the right and left trajectories is analyzed to detect a symmetry distortion therebetween to classify the type of activity causing the detected symmetry distortion.

The present invention in one form represents a method for object surveillance and real-time activity recognition which includes the steps of:

acquiring spatio-temporal images of a plurality of the objects, transforming the acquired spatio-temporal images into a spatio-temporal volume occupied by a respective object, crossing the spatio-temporal volume at a number of heights to obtain a plurality of 2-dimensional slices, each containing representation of a pair of trajectories of the motion of right and left corresponding portions of each of the object's body (such as right and left arms, right and left hands, right and left legs, or right and left feet), separating the representation of the pair of trajectories into a right and left rectified trajectories, analyzing symmetry of the right and left rectified trajectories in real-time domain based on the Frieze Symmetry Group to detect a symmetry distortion, classifying the detected symmetry distortion, and generating an indicia of a type of activity of the object causing the detected symmetry distortion.

The rectified right and left trajectories are formed by applying a Hough transform to the trajectories in each slice and extracting the right and left rectified trajectory representing each individual's gait topology which can be used as the individual signature.

The extraction of right and left rectified trajectories is carried out by:

dividing each 2-dimensional slice into strides (for legs and feet motion), dividing each isolated stride into four quadrants, each containing a respective segment of the pair of trajectories of the motion of the right and left portions of the individual's body, applying fitted principal curves for each quadrant, assembling and smoothing the single segments into a right trajectory and a left trajectory in accordance with intersection points, applying a spectral clustering to each quadrant, recalculating the intersection points of the right and left trajectories, dividing the right and left trajectories into four new quadrants in accordance with the recalculated intersection points, and iteratively repeating the previously identified sequence of steps for a predetermined number of iterations, thereby extracting the rectified right and left trajectories.

The method as described above of the present invention may be used for occlusion events handling and for clearing a silhouette from overlapping background pixels.

The present invention is further related to a system for object surveillance and real-time events recognition which comprises:
- a plurality of image sensing units for -sensing spatio-temporal images of the objects,
- a computer system acquiring the spatio-temporal images recorded by the image sensing units and processing the acquired images based on gait symmetry of each object under surveillance. For this process, the computer system includes a processing unit which includes:
- a gait subspace unit forming a spatio-temporal volume occupied by an object under surveillance,
- a decomposition unit crossing the spatio-temporal volume into a plurality of 2-dimensional slices, each slice containing a representation of a pair of trajectories of the motion of a right and left corresponding portions of the object's body,
- a detection unit detecting distortion of symmetry between the trajectories of the motion of the right and left portions of the body of the object in each slice, and
- a classification unit analyzing the detected symmetry distortion and outputting data representative of the object's activity causing the detect symmetry distortion.

The image sensing units which include both motion and stationary units for sensing motion of the individuals under surveillance, may include video cameras, line scan based lasers, range sensors, etc. The image sensing units may be positioned at any height and in any location of an area under surveillance.

These and other features and advantages of the present invention will become apparent after reading a further description of the preferred embodiment in conjunction with the patent drawings.

BRIEF DESCRIPTION OF THE DRAWINGS

FIGS. 9A and 9B show respectively the application of the fitted principal curves to the segments of FIG. 7C and restoring a complete Gait DNA;

FIGS. 13A-13D illustrate the principles of occlusion event handling and silhouette restoration.

DETAILED DESCRIPTION OF THE PREFERRED EMBODIMENT

The concept underlying the operation of the system of the present invention and a method for individual surveillance and activity recognition is based on the unique analysis of the gait topology of an individual and classifying the individual activity based on symmetry of the articulation topologies of the individual's gait in real-time domain.

In order to characterize individual gait topology in spatio-temporal domain and to demonstrate its usefulness for the individuals surveillance and activity recognition, a Double Helical Signature, also referred to herein as a Gait DNA, is introduced which is the topology of the individual's gait which may serve as identification of an individual due to the fact that the characteristics of the Gait DNA of a specific individual, such as step/stride length, cadence, trajectory of articulation of different portions of the body, etc., are different for different individuals. Although gait topology varies for different individuals, there exists a common feature, e.g., the gait topology of individuals naturally moving are characterized by their specific symmetries and compactness. An individual performing an unusual activity, e.g., carrying a load in one or both hands, or having a load, such as for example a an explosive device in a shoe, loses the symmetry and compactness of the walking pattern. Therefore, the approach of the present invention is based on revealing the symmetry or asymmetry of the gait of the individual under surveillance and uses gait topology to identify individuals and their activities.

Figure 1:
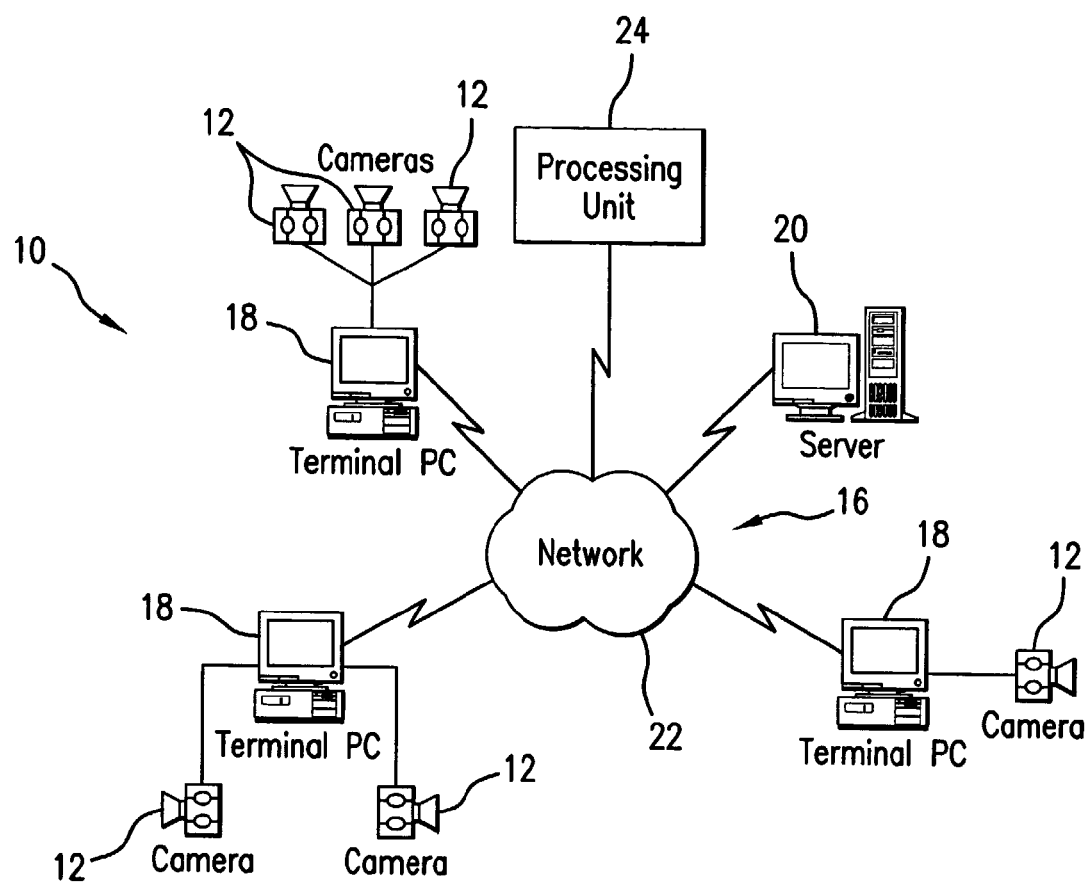
FIG. 1 is a schematic representation of a system for surveillance and activity recognition of the present invention.

Referring to FIG. 1, a surveillance system 10 of the present invention includes one or more of image sensing units 12 deployed in an area of interest and a computer system 16 which includes one or more computer terminals 18 associated with the image sensing units 12 and a server 20 all connected into a network 22. The computer system 16 includes a processing unit 24 which performs data processing, analysis, and generates signals indicative of a recognized activity of an individual (individuals) under surveillance.

The image sensing units 12 may be in the form of video cameras, stationary or moving, scanning devices, such as for example scanning lasers, range sensors, etc. The image sensing units 12 used in the surveillance system 10 serve the purposes of detecting spatio-temporal images of the object as shown in FIG. 3.

Figure 2:
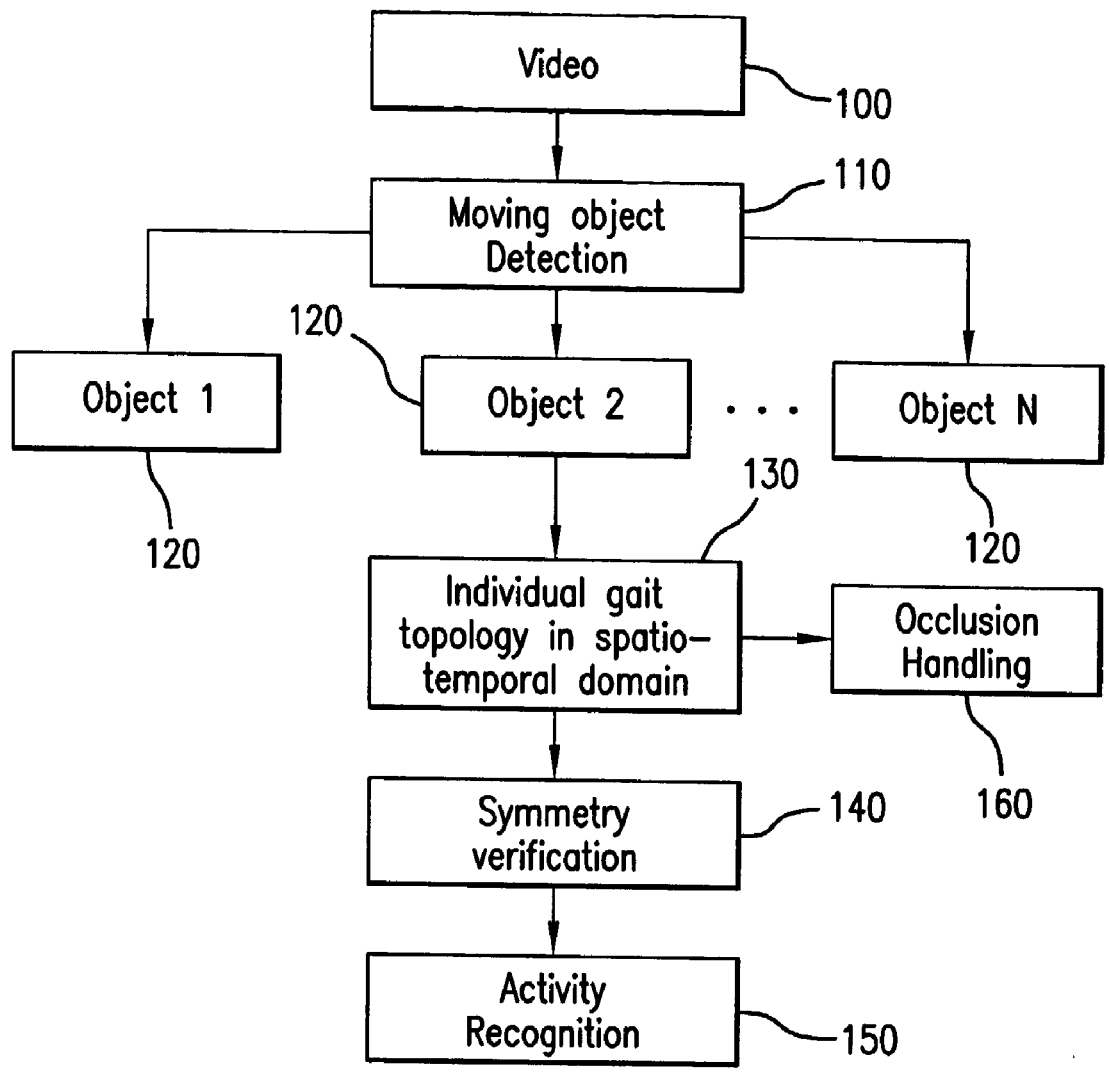
FIG. 2 is a flow chart diagram describing the operational principles of the system of the present invention.
Figure 3:
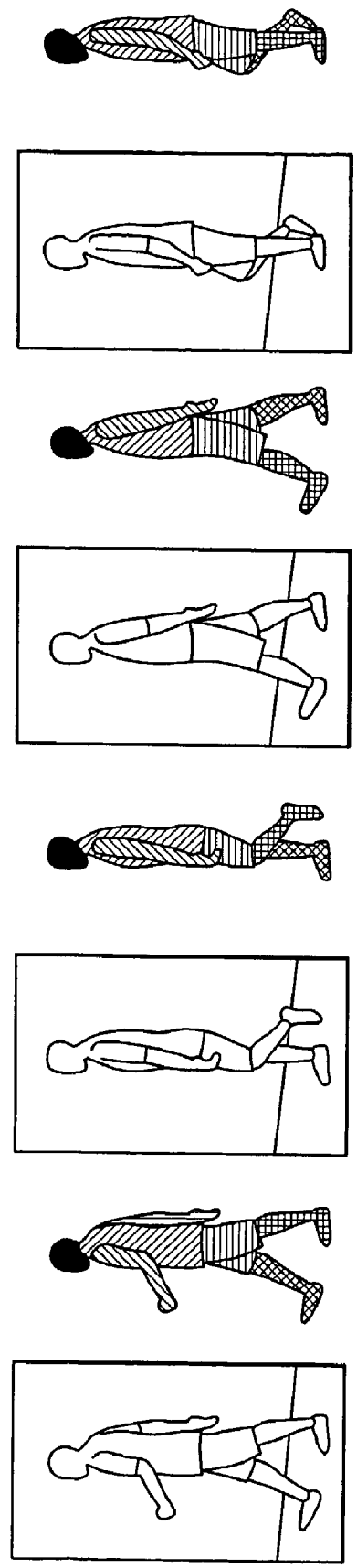
FIG. 3 is a sequence of spatio-temporal images of the individual under surveillance taken by cameras deployed at the area under surveillance.

Referring to FIGS. 2 and 3, the image sensing units acquire video images in block 100 "Video" on which a moving object may be detected in block 110 "Moving Object Detection". The moving object detection is performed in real-time fashion to detect a single or a plurality of objects 120 in motion. The walking human is characterized by the bi-pedal motion pattern and the upright pose. The characteristics of a human gait are explored in the present invention as the source of reliable information for making decisions of the individuals activity.

In the present invention, as shown in FIG. 2, an individual gait topology is acquired in spatio-temporal domain in block 130 as will be further detailed in following paragraphs. The symmetry characteristics of the individual gait topology are further verified in block 140 "Symmetry Verification". This is based on a symmetry in articulations of the right and left corresponding portions of the body wherein activity recognition is processed in block 150 as will be presented in detail in following paragraphs. An occlusion event may occur at the area under surveillance which may undermine the quality of monitoring. For this purpose, the system of the present invention is equipped with occlusion handling capability presented in block 160. The details of the occlusion handling will be presented further in detail in following paragraphs.

Figure 4:
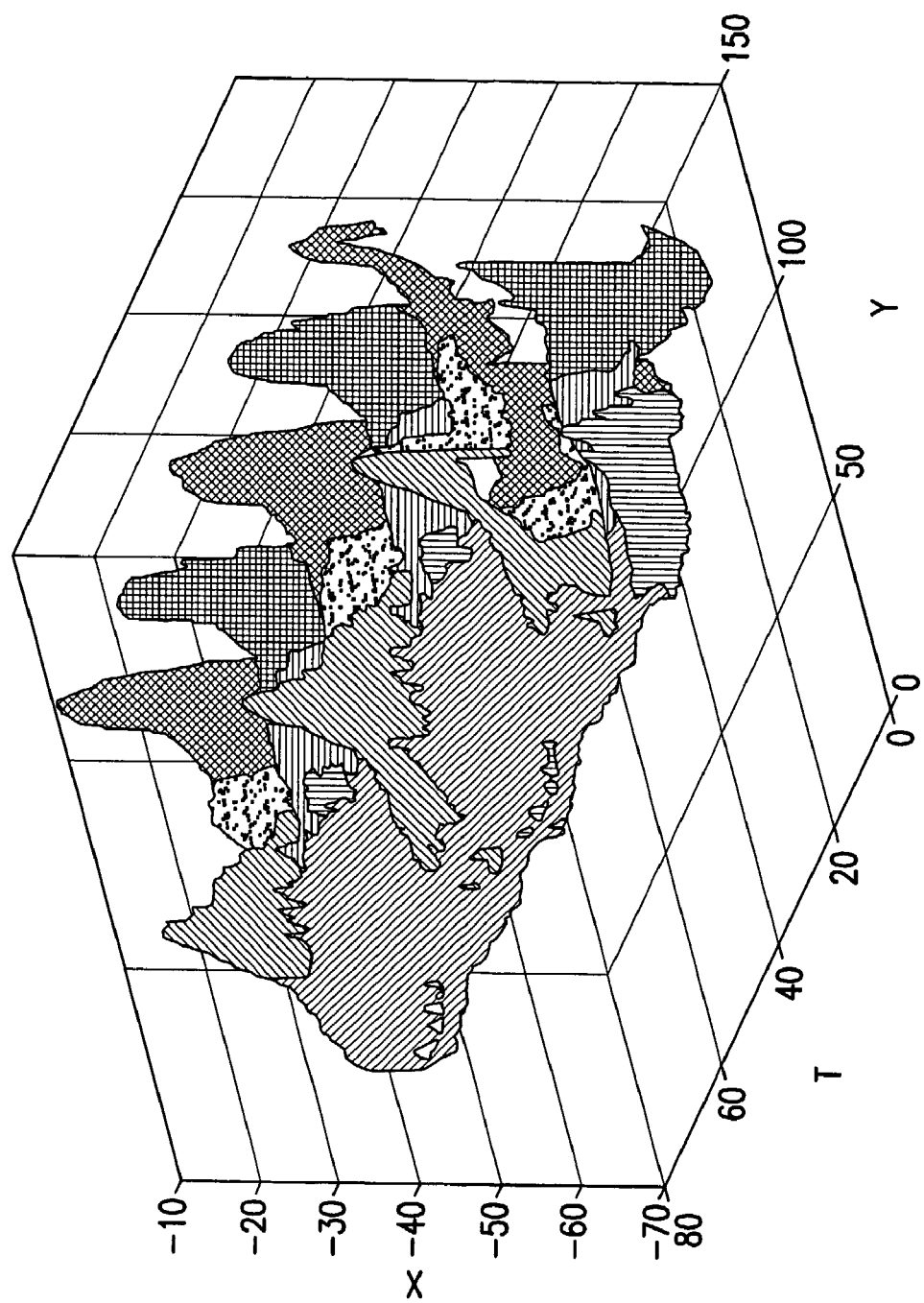
FIG. 4 is a spatio-temporal volume occupied by the individual shown in FIG. 3.
Figure 6:
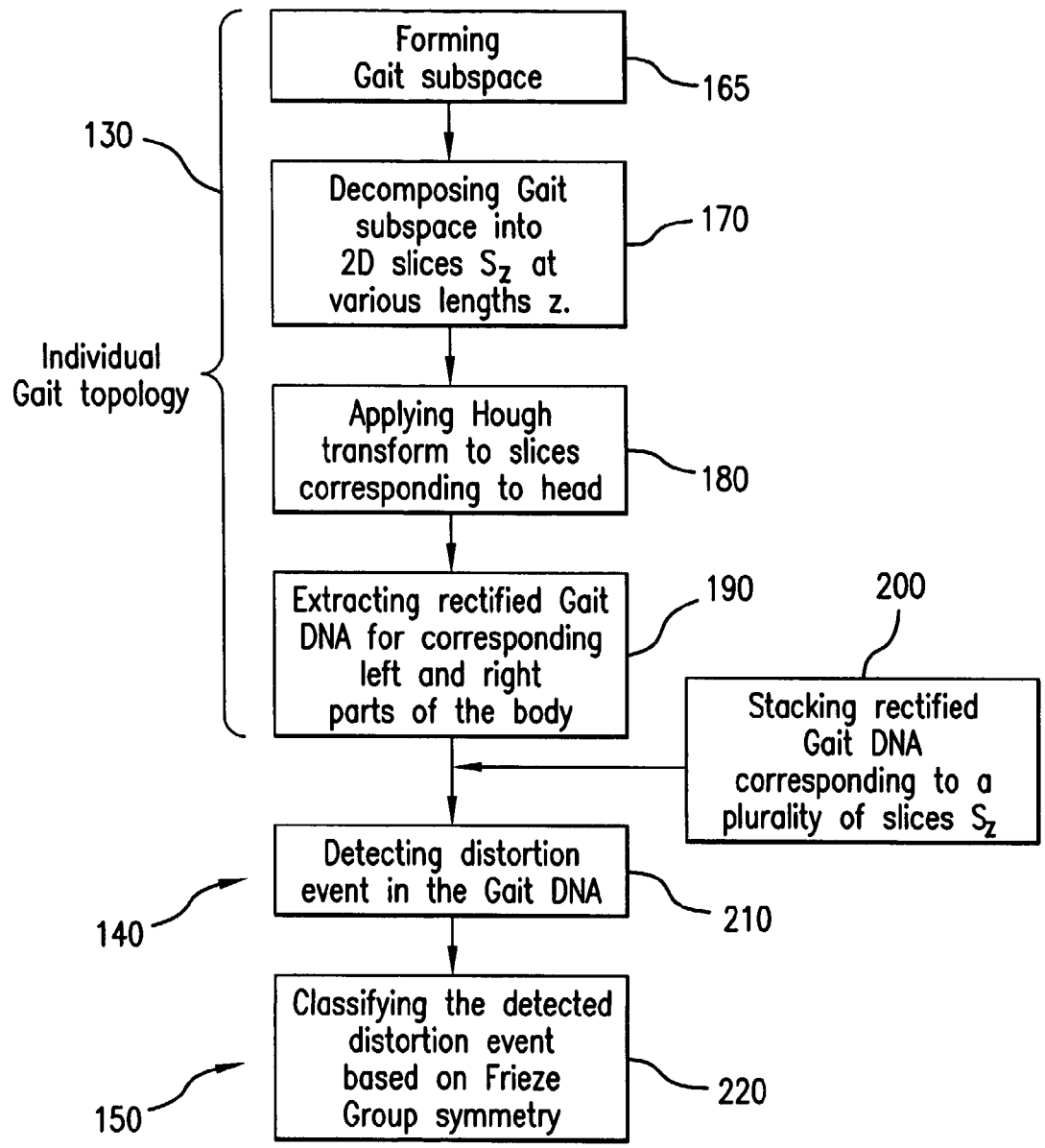
FIG. 6 is a flow-chart diagram representing a computer software underlying the operation of the system of the present invention.

Referring to FIG. 6, which presents in details the subroutine of the block 130 of FIG. 2, the individual gait topology analysis in spatio-temporal domain begins in block 165 "Forming Gait Subspace". The gait subspace shown in FIG. 4 is formed and is defined as the spatio-temporal (x-y-t) volume occupied by a walker shown in FIG. 3. Each portion of the spatio-temporal volume shown in FIG. 4, corresponds to a specific portion of a individual's body. The 3-dimensional volume in FIG. 4 represents an articulation of different portions of the individual's body in x-y spatial domain at each specific instant t.

Figure 5:
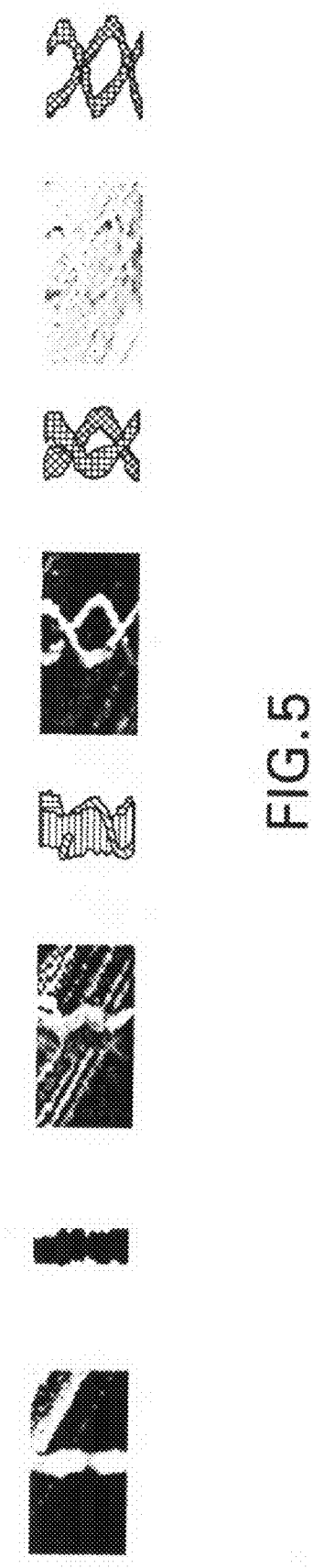
FIG. 5 illustrates a plurality of 2-dimensional slices $S_z$ obtained by decomposing the spatio-temporal volume of FIG. 4 at a plurality of heights.

The flow chart logic shown in FIG. 6 proceeds from the block 165 to the block 170 "Decomposing Gait Subspace into 2-D slices Sz at Various Heights z", wherein the gait subspace shown in FIG. 4 is crossed at various heights to form horizontal slices along the direction of the individual walk (in this example along the x axis) into 2-dimensional planes presented in FIG. 5 each of which includes a view dependent twisted pattern corresponding to the articulation (or trajectory) of motion of a respective portion of the individual's body at the height z of the slice $S_z$. The occluded helical patterns presented in each slice of FIG. 5 uniquely characterize the individual's gait style and can be used as a signature in the individual gait.

The term "gait signature" is defined herein as the set of 2-dimensional shapes $S=\{S_1,S_2 \ldots S_z \ldots\}$ formed by slicing the gait subspace shown in FIG. 4 at the various heights z covering the entire human body during a complete stride. For each Sz corresponding to hip-to-toe, the Gait DNA is characterized by the stride and step length, periodicity and cadence which can be obtained from analyzing the pattern in each slice Sz.

Two Theorems are used in the approach of the present invention:

Theorem 1: the Gait DNA generated by hip-to-toe gait articulation belongs to a Frieze Group with a translational period t/2.

Theorem 2: there exists a finite set of Gait DNA as a compact representation of the hip-to-toe gait subspace.

To obtain the Gait DNA the surveillance system of the present invention performs a unique set of operations which is initiated from forming the gait subspace in block 160 of FIG. 6. The gait subspace is decomposed into 2-D slices in block 170. The logic flow then goes to block 180 "Applying Hough Transform to Slices Corresponding to Head". Since gait subspace shown in FIG. 4 results from both intra- and inter-gait motion, the preprocessing Hough transform is applied to the slices corresponding to the head of the object (individual) in order to estimate the global trajectory of the head and in order to detect the Hough line as a central line for the Gait DNA for other body parts to compensate for the inter-gait motion of the individuals under surveillance.

The Hough transform is a technique which can be used to isolate features of a particular shape within an image and is most commonly used for the detection of regular curves such as lines, circles, ellipses, etc. The Hough technique is particularly useful for computing a global description of a feature, where the number of solution classes need not be known a priori given possibly noisy local measurements. The motivating idea behind the Hough technique for a line detection is that each input measurement (e.g., coordinate point) indicates its contribution to a globally consistent solution (e.g., the physical line which gives rise to that image point). The Hough transform employed for preprocessing of each slice is a transform known to those skilled in the art and for this reason is not described herein in further detail.

Figure 8:
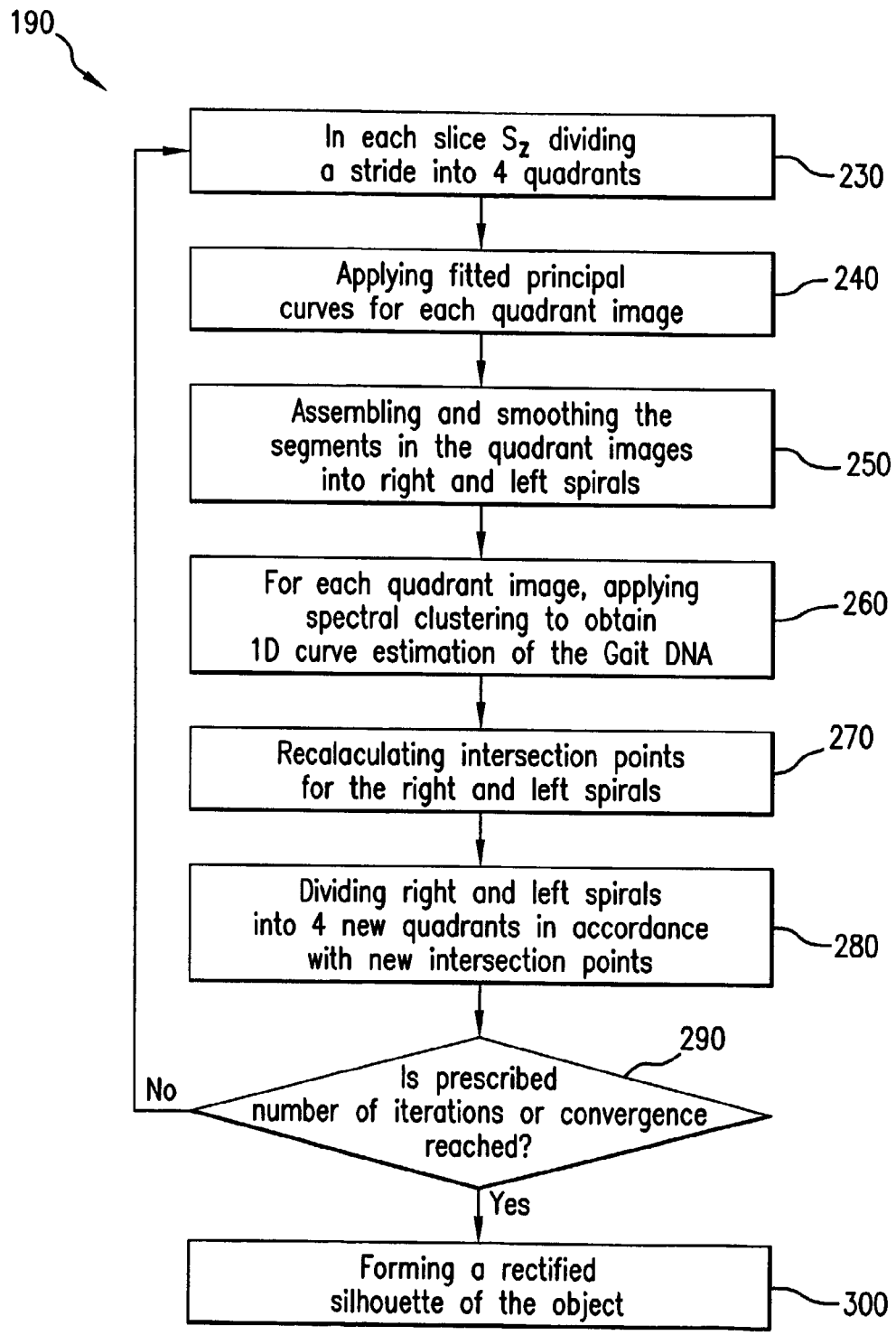
FIG. 8 is a flow-chart diagram representing a process of the spatio-temporal volume segmentation and rectified Gait DNA extraction.

Further, upon finding a Hough line in block 180 based on the information contained in the slices corresponding to the head of the object, the logic flows to block 190 "Extracting Rectified Gait DNA for Corresponding Left and Right Parts of the Body". Specifics of the procedure presented in block 190 are presented as a flow-chart diagram shown in FIG. 8 which is based on a divide-and-conquer strategy.

Figures 7A, 7B, 7C:
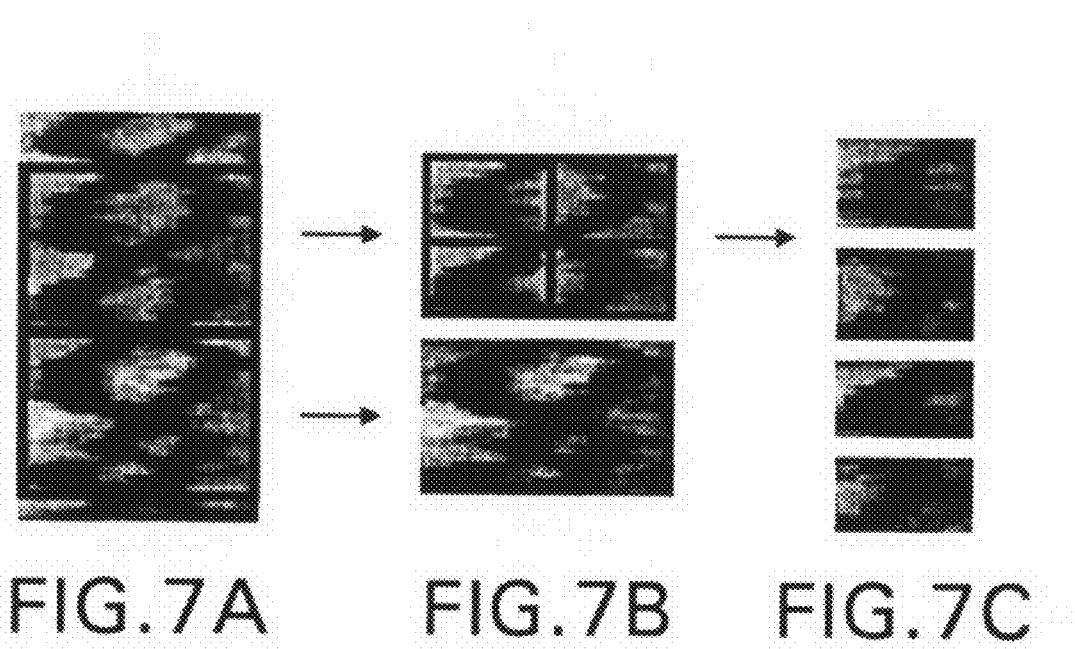
FIGS. 7A-7C represent a "divide-and-conquer" strategy employed for separating the Gait DNA shown in FIG. 7A into isolated strides shown in FIG. 7B and further dividing the strides into segments, each corresponding to a respective quadrant as shown in FIG. 7C.

Referring specifically to FIGS. 7A-7C and FIG. 8, and based on the Theorem 1, the Gait DNA presented in FIG. 7A is analyzed by using Frieze Group Symmetry.

It is known to those skilled in the art that the Frieze Group is a mathematical concept to classify patterns on 2-dimensional surfaces which are repetitive in one direction based on the symmetries in the pattern. Formally, a Frieze Group is a class of infinite discrete symmetry groups for patterns. There are seven different Frieze Groups. Actual symmetry groups within a Frieze Group are characterized by the smallest translation distance, and for certain groups by a shifting parameter. In the case of symmetry groups in the plane, additional parameters are the direction of the translation vector, and for some Frieze Groups, the positioning perpendicular to the translation vector. A symmetry group of a Frieze Group necessarily contains translations and may contain glide reflections. Other possible group elements are reflections along the long axis, reflections along the narrow axis, and 180° rotations. The patterns corresponding to the seven Frieze Groups are known to those skilled in the art and are not presented herein in further detail.

Referring to FIG. 7A, a complete Gait DNA obtained by crossing the gait subspace shown in FIG. 4 at a specific height, possibly at height between the hip and toe of the individual, includes a pair of trajectories of articulation of the legs (or feet) which have a plurality of intersecting points. The algorithm presented in FIG. 8, specifically the block 230 "In Each Slice Sz, Dividing a Stride into Four Quadrants" separates complete Gait DNA presented in FIG. 7A into single strides presented by two separate frames of FIG. 7B. As further presented, the upper frame of FIG. 7B containing a replica of a single stride is divided as shown by the vertical and horizontal central lines into four quadrants shown in FIG. 7C each of which includes a segment represented by non-self intersecting curve of the single stride. Each quadrant image of FIG. 7C contains the single curve capturing the subtlety of the gait (intra-gait articulations).

Dividing the entire Gait DNA of FIG. 7A into strides and further into four quadrants presented in FIG. 7C, is based on the assumption that the Gait DNA belongs to a Frieze Symmetry Group and has a translational periodicity (T/2) and an approximate horizontal reflection. Based on these assumptions, the Theorem 1 grants the success to the divide-and-conquer approach. The individual segmentation algorithm is presented as follows:

Individual Segmentation Algorithm

Input: a stacked sequence containing a individual gait subspace of FIG. 4

Output: segmented human body (slices Sz)

Algorithm Steps:
1. Decompose the data containing the gait subspace of one stride into slices (logic block 230 shown in FIG. 8).
2. Divide each slice in a stride into four quadrants by cutting centrally, vertically and horizontally (logic block 230).

In step 2, the quadrants are divided in block 230 into four quadrants, and the Gait DNA segments are further connected into polygonal lines to form smoothed Gait DNA curve for each leg. The fitted principal curves 26 shown in FIGS. 9A and 9B are applied for each quadrant image in block 240 to restore a complete Gait DNA. The Gait DNA restored as shown in FIG. 9B indicates a significant improvement over the original Gait DNA represented in FIG. 9A, and FIG. 7A.

3. Initialize line segments and fit principal curves for every quadrant image. To perform this procedure the logic flows to logic block 240 "Applying Fitted Principal Curves for Each Quadrant Image".
4. Connect and smooth line segments and fit principal curves into right and left spirals for two legs respectively. This step is performed in logic block 250.
5. Use spectral clustering to extract Gait DNA for each quadrant (as will be presented in algorithm "spectral clustering" further herein). The spectral clustering is performed in logic block 260.
6. Recalculate the intersection points from two spirals and divide into four new quadrants according to the new intersection points which procedure is preformed in block 270 "Recalculating Intersection Points for the Right and Left Spirals".
7. Divide right and left spirals into four new quadrants in accordance with new intersection points performed in block 280 "Dividing Right and Left Spirals into 4 New Quadrants".
8. Repeat Steps 2-7 until convergence or a pre-specified number of iterations is reached for each slice Sz. In performing this procedure the logic flow proceeds to block 290 "Is Prescribed Number of Iterations or Convergence Reached?". In block 290, the convergence condition is an error generated by spectral clustering as a byproduct. During the subroutine performance, the iterations are repeated until convergence or for a predetermined number of iterations (for example, 5 iterations).

If the answer in block 290 is "NO", the logic returns to block 230 and the steps 230-290 are iterated. If however, the answer is "YES", the flow chart proceeds to block 300 "Forming a Rectified Silhouette of the Object". The rectified Gait DNA for corresponding left and right parts of the body in box 190 results in smooth trajectories for each slice Sz which can be used for stacking to form a silhouette of the individual as presented in block 300 of FIG. 8 and block 200 of FIG. 6.

As each image contains pixels which are to be assigned either to a background, or to the Gait DNA, or to another object, the Gait DNA is used in the system of the present invention as a distance constraint based on the fact that pixels which are positioned close to the curves are more likely to belong to the body.

Hence, the Gait DNA plays a significant role in the learning and analysis of the slices Sz similar to the skeleton for silhouettes in regular images. To rectify trajectories, the standard spectral clustering technique is used is step 5 of the Individual Segmentation Algorithm, and the extraction and clustering steps for each slice Sz are iterated. The input to the clustering algorithm is a feature vector that combines the pixel intensity (or color) and a distance measure calibrating the proximity to the Gait DNA. The clustering algorithm is applied to each quadrant image in logic block 260 and includes the following steps:

---

Algorithm Spectral Clustering

Input: A single quadrant image
Output: 1D curve estimation of the Gait DNA
   1. Form a set of points S={s1, ... sn}, each element is a pixel in the quadrant.
   2. Form the affinity matrix. $A_{ij} = e - ||s_i - s_j||^{2/2\sigma^2}$ $i \neq j$ $A_{ii} = 0$. Each feature vector is the intensity and the distance from the pixel to the initial guess of Gait DNA
   3. Define diagonal matrix $D_{ii} = \Sigma_K a_{ik}$
   4. Form the matrix $L = D^{-1/2} AD^{-1/2}$
   5. Stack the k largest eigenvectors of L to form the columns of the new matrix X: $X_1, X_2, \ldots, X_k$
   6. Renormalize each of X's rows to have unit length. Cluster rows of Y as points in $R^k$
   7. Output clustering results to Step 4 segmentation algorithm.

---

In Step 5 of the Spectral Clustering, the a eigenvector represents a special set of vectors associated with a linear system of equations (i.e., a matrix equation) that are sometimes also known as characteristic vectors, proper vectors, or latent vectors.

The entire process of individual segmentation can be accelerated based on the Theorem 2 so that the extracted Gait DNA for one slice can be used for the initial condition for the slice above it. For the torso and head slices, a straight line can be used, while the algorithm for the hip-to-toe, is presented in previous paragraphs. It will be apparent to those skilled in the art that, although the segmentation procedure presented in previous paragraphs with regard to flow chart of FIGS. 6 and 8 has been described with reference to the head-to-toe slices, it is clear that the same principals are similarly applicable to the hands, arms, and feet of an individual.

Figure 10B:
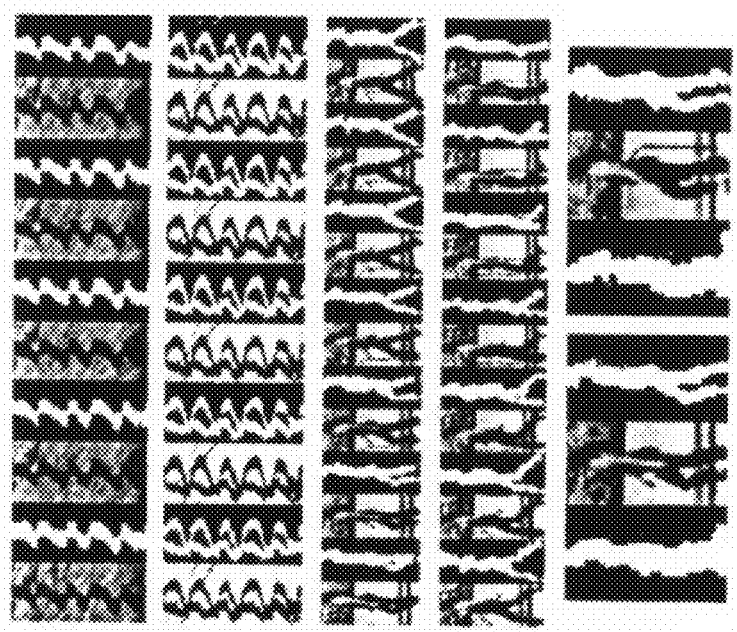
FIGS. 10A and 10B show respectively the results of application of the method of the present invention to rectify the silhouette from the background pixels which are inconsistent with Gait DNA curves.
Figure 10A:
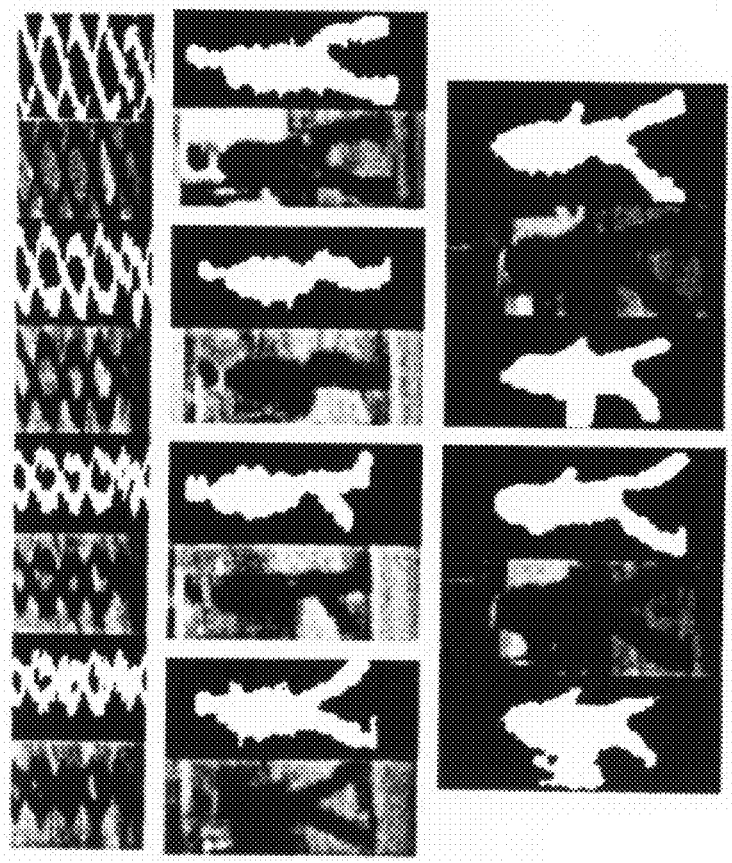

The segmentation algorithm has been tested on pedestrian videos acquired from static and moving sensors 12. FIGS. 10A and 10B show the result of computations according to the algorithm of the present invention applied to the images acquired by means of a moving camera and compares the results obtained by the method of the present invention (using the Gait DNA) and the method using the silhouette appearance on the video images. The images presented as white on black frames are the representation of the results obtained with the method of the present invention and show an efficient contrast clearness of the silhouette of the individual.

A problem with a moving object segmentation is that similar color of images in the background and foreground may deteriorate the silhouette as shown by the misclassified region close to the pedestrian's back at the left of FIG. 10A. The segmentation of the gait subspace into slices allows for removal of the background pixels due to their inconsistency with the Gait DNA curves.

Referring again to FIG. 6, upon extracting rectified Gait DNA in block 190, the logic flows to block 210 "Detecting Distortion Event in the Gait DNA" where the routine for an event (activity) detection starts. Unlike the conventional activity analysis, where gait abnormalities are typically detected by measuring changes from silhouettes, which easily effected by segmentation errors, the event detection and classification in the present system and method is based on a unique approach of analyzing body portions articulation as they are projected on each of the 2-dimensional slices. Specifically, the system analyzes the trajectories of the individual motion in slices in view of Frieze Group Symmetry.

Figure 11:
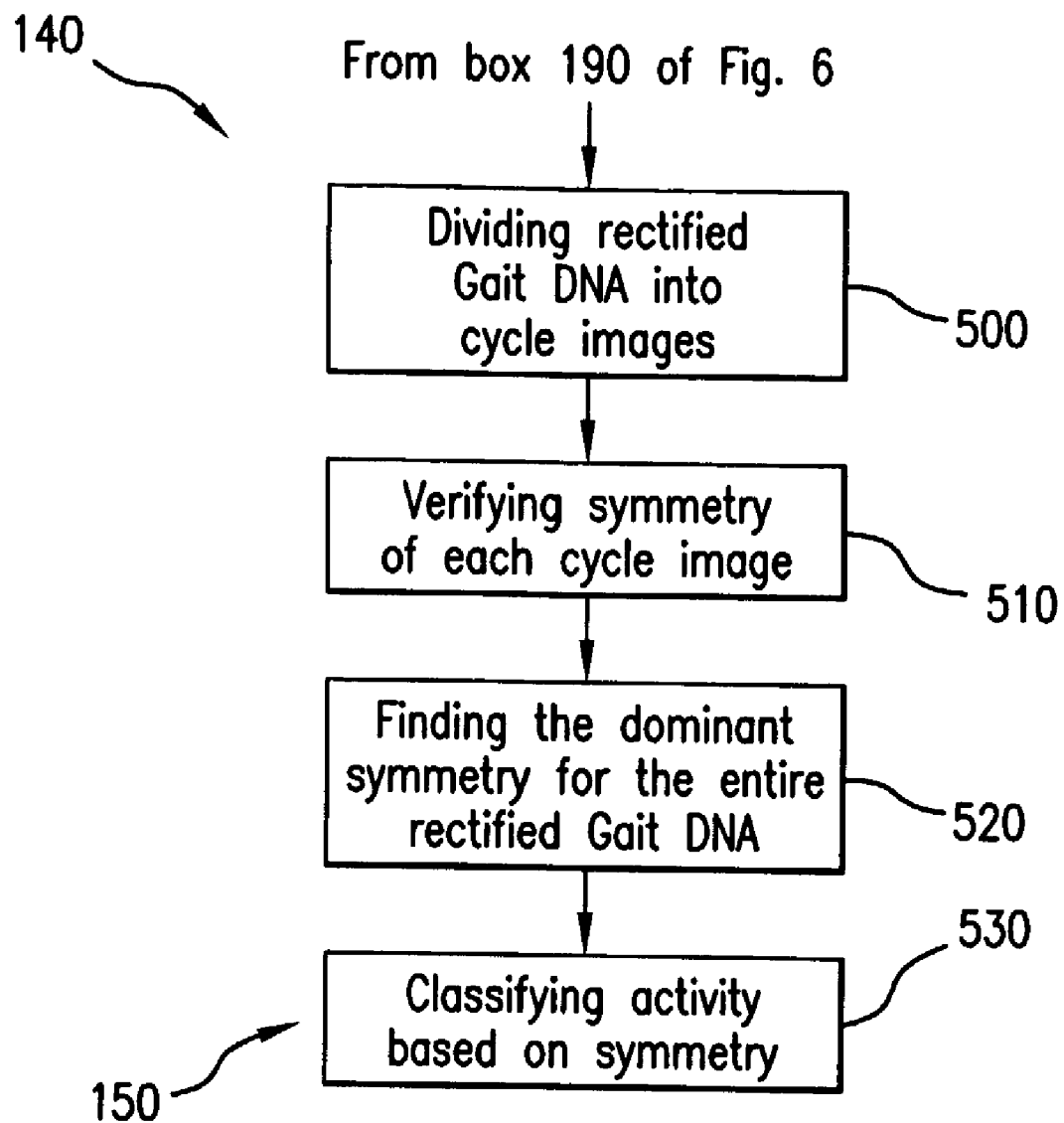
FIG. 11 is a flow-chart diagram of the sub-routine for symmetry verification.

The subroutine provided in block 210 is presented in detail in FIG. 11 which starts with inputting data from the block 190 of FIG. 6 into the block 500 "Dividing Rectified Gait DNA into Cycle Images" in which a pair of kinematical chains oscillating out of phase as shown in FIG. 9B is divided into cycles containing a predetermined number of oscillation.

For example, if the motions of the object's legs are analyzed, each cycle will contain two walking steps. If the articulation of the arms is to be analyzed, then each cycle will contain two swinging arms. Further, upon dividing the rectified Gait DNA into cycle images in block 500, the logic flows to block 510 "Verifying Symmetry of Each Cycle Image" in which various symmetries are verified for each cycle image I. The symmetry verification is carried out by the sequence of the following operations:

a. for each symmetry, transform the cycle image of I into the corresponding symmetry cycle image I' which is a new image subsequent to applying a symmetry transform to the cycle image I. The symmetry transform may include horizontal reflection symmetry, rotational symmetry, etc. For example, in the case of horizontal reflection symmetry, the image I is reflected horizontally to obtain image I'. For 180° rotational symmetry, the image I' is obtained by rotating the image I around its center by 180°.

b. Upon forming the symmetry cycle image I', the logic calculates a residue parameter E by subtracting the image I from the image I', e.g., E=|I−I'|.

c. In this step, logic of block 510 compares the residue parameter E to a preset threshold T. If E is lower than T, the symmetry is claimed to be found for the cycle image I.

When symmetry is found for each cycle image in block 510 of the entire Gait DNA, the logic flows to block 520 "Finding the Dominant Symmetry for the Entire Rectified Gait DNA" in which the dominant symmetry for the entire Gait DNA is found by voting. The dominant symmetry for the entire Gait DNA under investigation is assigned to this Gait DNA.

As soon as the entire Gait DNA is assigned its symmetry in block 520, the flow chart proceeds to the block 530 "Classifying Activity Based on Symmetry" which corresponds to block 150 "Activity Recognition" of FIG. 2 and block 220 "Classifying the Detected Distortion Event Based on Frieze Group Symmetry" in FIG. 6.

Figure 12A:
FIGS. 12A-12D illustrate correspondence between Gait DNA and individual activities.
Figure 12B:
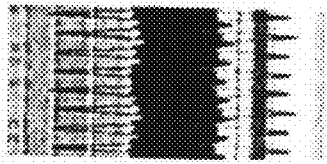

Referring to FIGS. 12A-12D, presenting the Gait DNA in the slices crossing the gait subspace of FIG. 4 at the height corresponding to the hands of the individual for different activities, it is seen that a presence of a sufficiently heavy object distorts Gait DNA at least in the hands regions. During a natural walking sequence presented in FIG. 12A, the hands maintain the center of gravity above the point of the contact of the body with the ground, and move to balance the body during bi-pedal legs swing. Several activities, e.g., natural walking (FIG. 12A), carrying an object on the back (FIG. 12B), carrying an object with one hand (FIG. 12C), and holding an object in the hands (FIG. 12D) are examined for different symmetries in the Gait DNA in FIGS. 12A-12D. For example, vertical symmetry exists for all events, but only natural walking has horizontal symmetry as shown in FIG. 12A. When an individual carries a load on the shoulders, as presented in FIG. 12B, the 180° rotational symmetry and vertical symmetry are seen.

Figure 12C:
Figure 12D:

However, one side of the Gait DNA disappears if an individual carries an object in one hand as presented in FIG. 12C. The entire Gait DNA disappears when an individual holds an object in his/her arms, as shown in FIG. 12D. Therefore, by analyzing the symmetry of the Gait DNA at a 2-dimensional slice Sz corresponding to the hands of an individual, if horizontal reflection is seen, the event is classified as natural walking. Otherwise, if one side of the Gait DNA in hand slices disappears, the activity is classified as "holding in one hand".

In contrast to the above two periodical Gait DNA, if neither periodicity or symmetry are observed in the hand slices, the activity is classified as "holding in two hands". A similar approach can be used for classifying activity based on symmetry of legs (feet) slices.

In an experiment presented with regard to FIGS. 12A-12D, the Gait DNA was considered at the slice Sz taken at ¼ of the body height from the head. The test was carried out for 34 indoor video sequences and 93 outdoor video sequences recorded from various targets, distances, backgrounds and lighting levels. All the videos were collected from side view of an individual. Table 1 presents the results of the experimentation.

TABLE 1

| | NONE | ONE HAND | ARMS | FALSE ALARM |
|---|---|---|---|---|
| TOTAL | 40 | 31 | 22 | N/A |
| NONE | 37 | 1 | 2 | 7.5% |
| ONE HAND | 2 | 27 | 1 | 10.0% |
| ARMS | 1 | 3 | 19 | 17.4% |
| RECOGNITION % | 92.5% | 87.1% | 86.4% | |

Table 1 summarizes the classification results "detection rates" (the percentage of observed events that are correctly classified) and "false alarm rates" (the percentage of events that are classified incorrectly). As seen from Table 1, for the indoor dataset, almost 100% classification rate is achieved with zero false alarms. Three events are listed in Table 1: "None" for natural walking, "one hand" for carrying objects, and "arms" for holding in both arms. The average detection rate achieved is 88.7%, and the false alarm is as low as 11.7%. Most of the false alarms are due to the self-occlusion of human body which suggests including projection geometry or collaborating with multiple camera in future work. The method of the present invention may be directly applied with line scan based laser or range sensors without capturing the entire scene. By using these types of image sensing units, computational power and resources are saved.

When surveying a scene with more than one individual, an occlusion event may take place which may severely undermine the results of the surveillance. However, the present invention provides for effective occlusion handling feature 160 (FIG. 2) which restores the silhouette of the occluded individual in efficient real-time manner as will be described further with reference to FIGS. 13 and 14. Occlusion handling is performed based on the assumption that the helical pattern (Gait DNA) is consistent in time due to its periodicity and symmetry. To perform occlusion handling, the camera (or any other image sensing unit) is set so that a ground plane can be quickly estimated and individual Gait DNA before and after occlusion is extracted as described in previous paragraphs.

The foreground pixels in each 2-dimensional slice Sz are classified by comparing with the Gait DNA color distribution each interfering individual to assign them to the individual having the most similar characteristics. The occluded pixels may be restored almost perfectly by filling in with the unoccluded Gait DNA of a respective individual.

The segmentation under severe occlusion and restoring of the silhouette of an occluded individual is presented in FIGS. 13A, B, C, and D, wherein FIG. 13A represents a column containing four images: first and third images (from the top) represent original slices taken both for individuals before and after occlusion. Images 2 and 4 (from the top) are the segmented masks corresponding to their original slices (the segmented mask is the binary image of the original slice where white lines represent foreground while the black field is a background of the scene). FIG. 13B represents separated individual Gait DNA of each interfering individual before and after the occlusion. FIGS. 13C and 13D show a restored silhouette of the occluded individual as a result of occlusion handling by the logic of the present system and method.

Figure 14:
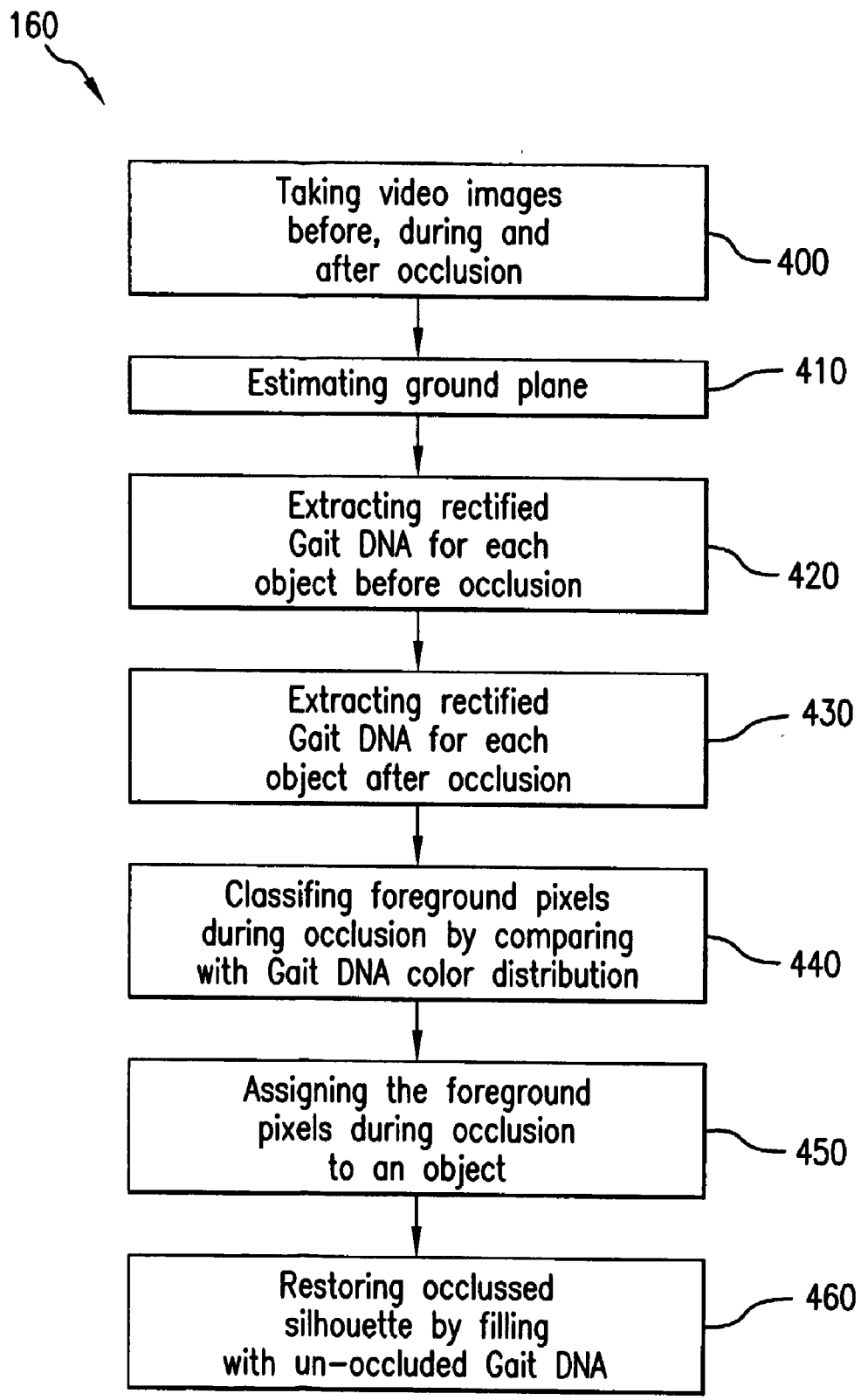
FIG. 14 is a flow-chart diagram of a occlusion handling subroutine of the present invention.

Occlusion handling is carried out in correspondence to the occlusion handling algorithm presented in the following paragraphs. Referring to FIG. 14, the occlusion handling starts in block 400 "Taking Video Images Before, During and After Occlusion" where the image sensing units take images of the scene under surveillance before, during and after the occlusion event. In block 400, the logic also detects the occlusion event. For this the trajectories are obtained for each interfering individual by detecting lines of heads in slices Sz formed from the subspace created from the video images taken in block 400. If a pedestrian changes his/her walking direction, the trajectory of his/her direction will split. Occlusion events Oi (j1, j2, . . . ), wherein i includes 1, 2, . . . m are detected by finding the intersection of any two trajectories as shown in FIG. 13A. Here, the i is the index of the occlusion segment, and j1, j2 . . . are indices of the interfering individuals.

From the block 400, the flow chart proceeds to block 410 "Estimating Ground Plane" where the extracted background and foreground is shown as segmented masks in FIG. 13A. Further, the logic flows to block 420 "Extracting Rectified Gait DNA for Each Object Before Occlusion" and further to the block 430 "Extracting Rectified Gait DNA for Each Object After Occlusion", where the Gait DNA is extracted for each interfering individual using a technique presented in block 190 of FIG. 6. The separated individual Gait DNAs for interfering individuals are presented in FIG. 13B.

Upon detecting the occlusion event, for each occlusion Oi, the following steps are repeated in block 440 "Classifying Foreground Pixels During Occlusion by Comparing with Gait DNA Color Distribution":

divide the gait subspace for occlusion Oi into 2-dimensional x-t slices Sz, for each individual, translating his/her extracted Gait DNA into the occlusion slice, and for each pixel in a slice in the occlusion slice, test its probabilities for all the corresponding individuals' Gait DNA color distribution.

Upon testing the probability for all occluded pixels, the logic moves to block 450 "Assigning the Foreground Pixels During Occlusion to an Object", where the occluded pixels are assigned to a respective individual's Gait DNA which has the highest probability of correspondence. The occluded silhouette is restored in block 460 by filling the same with unoccluded Gait DNA of the individual to which the occluded pixels were assigned. The restored silhouette is shown in FIGS. 13C and 13D.

As described in previous paragraphs, the introduction of a Double Helical Signature (Gait DNA) as a characteristic of human gait topology in spatio-temporal domain is demonstrated to find its usefulness in a novel surveillance system capable of segmentation and real-time event recognition.

The novel human activity monitoring system naturally integrates understanding of a temporal information for human body motion to identify, in real-time, individuals and their activities in an efficient manner and does not require expensive power and memory processing facilities. By decomposing the gait subspace into 2-dimensional slices and explicitly using a gait model, it is suggested that the spatio-temporal pattern generated by body articulation belongs to a specific symmetry group (a Frieze Group), and therefore forms an efficient signature of an individual.

A robust pedestrian monitoring system is implemented that detects, tracks targets, and recognizes events by applying temporal Gait DNA analysis. Unlike conventional methods based on silhouette images, the present system explores the new possibilities for efficient surveillance research in temporal domain. The pedestrian monitoring system is based on analyzing Gait DNA in planes parallel to the ground which is especially useful for applications such as in building or parking lot security.

Unlike most existing surveillance systems, the proposed system prefers cameras (or other image sensing units) to be located slightly higher than the ground plane so that the Gait DNA is observable. Generally speaking, given the ground plane, extracting the temporal Gait DNA is equivalent to detecting and tracking of the pedestrians and hence opens a new area directed to pedestrian surveillance research. It is to be understood, that the cameras and other image sensing units can be positioned at any height and deployed in any area under surveillance both indoors and outdoors. The novel surveillance system is believed to find its applicability in areas where fast and reliable surveillance is needed, such as homeland security, defense industry, traffic control, residency security, etc.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A method for objects surveillance and real-time activity recognition, comprising the steps of:

combining a plurality of image sensing units and a computer processor into an activity monitoring network, acquiring spatia-temporal images of a plurality of the objects from said plurality of image sensing units, for each of a plurality of objects, forming a spatio-temporal volume occupied by said each object, decomposing said spatia-temporal volume by crossing the same at a plurality of heights z, thereby forming a plurality of 2-Dimentional slices $S_z$, each said 2-dimensional slice $S_z$ containing a representation of a pair of trajectories of the motion of right and left corresponding portions of said each object's body, separating said representation of said pair of trajectories in said each 2-dimensional slice $S_z$ into a right and a left rectified trajectories, analyzing a symmetry of said right and left rectified trajectories in said each 2-dimensional slice $S_z$ to detect a symmetry distortion;

classifying said detected symmetry distortion; and generating data indicative of a type of activity of said each object causing said detected symmetry distortion.

2. The method of claim 1, wherein said classification of said detected symmetry distortion is based on the Frieze Symmetry Group principles.

3. The method of claim 1, further comprising the steps of:

Subsequent to said decomposition of said spatio-temporal volume into said plurality of 2-dimensional slices $S_z$, applying a Hough transform to slices $S_z$ corresponding to the head of said each object to obtain a central line for said pair of trajectories.

4. The method of claim 3, further comprising the step of:
Subsequent to the application of the Hough transform, extracting said right and left rectified trajectories representing an individual gait topology of said each object.

5. The method of claim 4, wherein said extraction of the rectified right and left trajectories comprises the steps of:
dividing each said slice $S_z$ into isolated strides,
(a) dividing each isolated stride into four quadrant images, each of said four quadrants images containing a respective segment of said pair of trajectories of the motion of the right and left corresponding portions of said each object's body,
(b) applying fitted principal curves for said each quadrant image,
(c) assembling said respective segments into a right trajectory and a left trajectory, said right and left trajectories having intersection points,
(d) applying spectral clustering to said each quadrant image,
(e) re-calculate said intersection points of said right and left trajectories,
(f) dividing said right and left trajectories into four new quadrant images in accordance with said re-calculated intersection points, and
(g) iteratively repeating said steps (a)-(f) for a pre-determined number of iterations, thereby extracting said rectified right and left trajectories.

6. The method of claim 2, wherein said step of analyzing symmetry comprises the steps of:
dividing said right and left rectified trajectories into a plurality of cycle images (I),
verifying each symmetry from the Frieze Symmetry Group of each of said plurality of cycle images (I) by performing the steps of:
(h) symmetry transforming said each cycle image (I) into a corresponding symmetry cycle image (I'),
(i) subtracting said each cycle image (I) from said corresponding symmetry cycle image (I'), thus obtaining a residue parameter (E),
(j) comparing the residue parameter (E) to a preset threshold (T), symmetry being found for said each cycle image (I) if $E \leq T$, and
(k) obtaining a dominant symmetry for said right and left rectified trajectories for said plurality of cycle images (I).

7. The method of claim 5, further comprising the steps of:
applying said step (g) for said plurality of 2-dimensional slices in sequence, and
using said extracted rectified right and left trajectories of a slice taken at a lower height as an initial condition for a slice taken at a higher height.

8. The method of claim 7, further comprising the steps of:
Subsequent to the step (g), integrating said right and left rectified trajectories of said plurality of slices $S_z$, thus forming a rectified silhouette of said each object.

9. The method of claim 8, further comprising the step of:
rejecting background pixels inconsistent with said extracted rectified right and left trajectories.

10. The method of claim 8, wherein an occlusion event occurs between at least a first and a second objects of said plurality of objects and wherein an occluded silhouette is to be formed, further comprising the steps of acquiring said spatiotemporal images for said at least first and second objects before, during and after the occlusion event,
forming said spatio-temporal volume for said at least first and second objects corresponding to the occlusion event,
estimating ground plane,
extracting said rectified right and left trajectories of each of said at least first and second objects before and after the occlusion event,
classifying occluded pixels of said spatia-temporal images relating to the occlusion event,
assigning said occluded pixels to a respective one of said at least first and second objects, and
restoring said occluded silhouette.

11. The method of claim 10, further comprising the steps of:
subsequent to acquiring said spatio-temporal images, obtaining trajectories of motion of said at least first and second objects by detecting trajectories of heads thereof presented in said 2-dimensional slices corresponding to the heads of said at least first and second objects,
detecting occlusion event by finding intersection of any two trajectories of motion of said at least first and second objects, and
for each detected occlusion event, iteratively performing the steps of:
(l) decomposing said spatiotemporal volume corresponding to said occlusion event into occluded slices,
(m) for each of said at least first and second objects translating said extracted right and left rectified trajectories before and after the occlusion event into said occluded slices,
(n) for each occluded pixel in each of said occluded slices, testing probabilities of said occluded pixels to belong to said extracted right and left rectified trajectories of said at least first and second objects before and after the occlusion event, and
(o) assigning said occluded pixels to a respective one of said at least first and second objects based on a highest probability.

12. The method of claim 1, further comprising the step of;
positioning said plurality of image-sensing units in proximity to the ground plane to monitor gait of objects under surveillance.

13. The method of claim 1, wherein said corresponding portions of said each object's body include right and left arms, right and left hands, right and left legs, and right and left feet, and wherein said activity type is selected from a group consisting of: natural walking, carrying an extraneous item in one hand, holding an extraneous item by both hands, carrying an extraneous item attached to a leg, carrying an extraneous item attached to a foot.

14. A system for objects surveillance, and real time events recognition, comprising:
a plurality of image sensing units for sensing spatio-temporal images of objects,
a computer processor for acquiring the spatiotemporal images of the objects from said plurality of image sensing units, said computer processor including a processing unit for processing said spatio-temporal images,
said processing unit including:
a gait subspace unit forming a spatio-temporal volume occupied by at least one object,
a decomposition unit crossing said spatio-temporal volume occupied by the object at a plurality of heights z into a plurality of 2-dimensional slices, each slice corresponding to a respective one of said plurality of heights z and containing representation of a pair of trajectories of the motion of a right and left corresponding portions of the body of the object, wherein said pair of trajectories is representative of said object's gait topology, a detection unit detecting distortion of a symmetry between the trajectories of the motion of said right and left portions of the object's body in said each slice, and a classification unit analyzing the detected symmetry distortion and outputting data representative of the object's activity causing the detected symmetry distortion.

15. The system of claim 14, wherein said classification unit analyzes the detected symmetry distortion based on the principles of Frieze Group Symmetry.

16. The system of claim 14, wherein said image sensing units are selected from a group consisting of: static sensors, moving sensors, video cameras, scanning lasers, and range sensors.

17. The system of claim 15, further comprising a Hough transform unit coupled to an output of said decomposition unit to obtain a central line for said pair of trajectories in said each slice based on information contained in the slices corresponding to the head of said object.

18. The method of claim 17, further comprising an extraction unit coupled to an output of said Hough transform unit and extracting right and left rectified trajectories of the gait topology of said object.

19. The system of claim 18, further comprising a silhouette forming unit coupled to said extraction unit for stacking said plurality of 2D slices containing said right and left extracted rectified trajectories, thereby forming a rectified silhouette of the object.

20. The system of claim 18, further comprising an occlusion handling unit coupled to said extraction unit, said occlusion handling unit processing said extracted rectified trajectories in said each slice prior and following the occlusion event of at least two interfering objects, one object occluding another, assigning occluded pixels of said spatio-temporal images during the occlusion event to a respective one of said at least two interfering objects, and restoring an occluded silhouette by assigning said occluded pixels to a respective one of said at least two interfering objects.

* * * * *